(12) United States Patent
Conrad et al.

(10) Patent No.: US 8,036,720 B1
(45) Date of Patent: Oct. 11, 2011

(54) METHOD AND SYSTEM FOR CONSERVING POWER IN A TELECOMMUNICATIONS NETWORK DURING EMERGENCY SITUATIONS

(75) Inventors: Stephen H. Conrad, Algodones, NM (US); Gerard P. O'Reilly, Manalapan, NJ (US)

(73) Assignee: Sandia Corporation, Albuquerque, NM (US)

( * ) Notice: Subject to any disclaimer, the term of this patent is extended or adjusted under 35 U.S.C. 154(b) by 294 days.

(21) Appl. No.: 12/399,480

(22) Filed: Mar. 6, 2009

(51) Int. Cl.
*H04B 1/38* (2006.01)
*H04M 11/04* (2006.01)

(52) U.S. Cl. .................... 455/574; 455/404.1
(58) Field of Classification Search .......... 455/90.1, 455/343.2, 404.1, 404.2, 574, 417, 456.4, 455/456.5
See application file for complete search history.

(56) References Cited

U.S. PATENT DOCUMENTS

| | | | |
|---|---|---|---|
| 6,345,180 B1* | 2/2002 | Reichelt | 455/404.1 |
| 6,509,833 B2* | 1/2003 | Tate | 340/539.1 |
| 6,928,147 B2* | 8/2005 | Gonsalves et al. | 379/32.01 |
| 7,127,230 B2* | 10/2006 | Aaron | 455/404.1 |
| 7,218,924 B2* | 5/2007 | McArdle | 455/418 |
| 2007/0238454 A1* | 10/2007 | Chambers | 455/422.1 |
| 2009/0143046 A1* | 6/2009 | Smith | 455/404.1 |

* cited by examiner

*Primary Examiner* — Nick Corsaro
*Assistant Examiner* — Michael S Bush
(74) *Attorney, Agent, or Firm* — Olivia J. Tsai

(57) ABSTRACT

Disclosed is a method and apparatus for conserving power in a telecommunications network during emergency situations. A permissible number list of emergency and/or priority numbers is stored in the telecommunications network. In the event of an emergency or power failure, input digits of a call to the telecommunications network are compared to the permissible number list. The call is processed in the telecommunications network and routed to its destination if the input digits match an entry in the permissible number list. The call is dropped without any further processing if the input digits do not match an entry in the permissible number list. Thus, power can be conserved in emergency situations by only allowing emergency and/or priority calls.

22 Claims, 4 Drawing Sheets

METHOD AND SYSTEM FOR CONSERVING POWER IN A TELECOMMUNICATIONS NETWORK DURING EMERGENCY SITUATIONS

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention is generally directed to conserving power in a telecommunications network. More specifically, the present invention is directed to conserving power in a wireless telecommunications network in emergency situations.

In a wireless telecommunications network, telephone calls can be initiated by users activating a wireless communication device (e.g., cellular telephone, personal digital assistant, laptop computer, etc.). The wireless communication device is recognized by a base station in the wireless telecommunications network, and the base station gives authorization to the wireless communications device to make a call. A user typically inputs (i.e., dials) digits using a wireless communication device, and the wireless communication device transmits the digits to the base station. The base station typically relays the incoming digits to a Mobile Switching Center (MSC), which processes the digits and routes the call to a destination associated with the dialed digits.

Base stations and MSCs consume power when processing and routing calls. Usually, commercial power is supplied from an electric utility. In this case, as much power as needed in order to set-up, connect, and disconnect calls is typically supplied to the base stations and MSCs from the electric utility. However, in the event of a power blackout, no commercial power is available to wired and wireless switching networks. In this case, electricity generators are typically used at telephone central offices to provide backup power. Also, battery back-up is typically available at base stations and smaller switching locations to provide power. The amount of time the back-up power supplied by generators and batteries lasts is limited and depends on the calling load and the demand placed on the switching systems.

During emergency situations which can lead to power outages, such as natural disasters or terrorist attacks, many users typically attempt to call public based emergency services, such as 911, to alert police, fire, and medical personnel. Furthermore, some government and business officials can place priority calls using Government Emergency Telecommunications Service (GETS) or Wireless Priority Service (WPS), such that their calls are prioritized over other calls. These services can be utilized by a user entering a special code along with a telephone number. Also, during emergency situations, mass calling from the population can occur, which causes congestion of telecommunications networks. Thus, during emergency situations, the call load in a telecommunications network and the demand on switching systems is typically higher than normal. Accordingly, back-up power supplies are depleted rapidly during emergency situations, when emergency calling and priority calling are at their peak need.

BRIEF SUMMARY OF THE INVENTION

The present invention provides a method of conserving power in a telecommunications network for emergency and priority calls. The present invention is directed to a method and system which can allow only emergency and/or priority calls during emergency situations or power outages.

According to an embodiment of the present invention, a call including input digits is received from a communication device at a device in a telecommunications network. A permissible number list can be maintained on a device in the telecommunications network. At least one entry in the permissible number list can be a number for emergency services, such as 911. The permissible number list can also at least one entry that is a code corresponding to at least one priority service, such as Government Emergency Telecommunications Service (GETS) and Wireless Priority Service (WPS). The input digits of the call are compared to the permissible number list. If the input digits are included in the permissible number list, the call is routed to its destination. If the input digits are not included in the permissible number list, the call is dropped.

The present invention allows power to be conserved for important calls, such as emergency and priority calls, and leads to back-up power sources lasting longer in emergency situations. The present invention also reduces telecommunications network traffic that can occur during emergency situations to ensure that enough bandwidth exists for emergency calls.

These and other advantages of the invention will be apparent to those of ordinary skill in the art by reference to the following detailed description and the accompanying drawings.

DETAILED DESCRIPTION OF THE INVENTION

Figure 1:
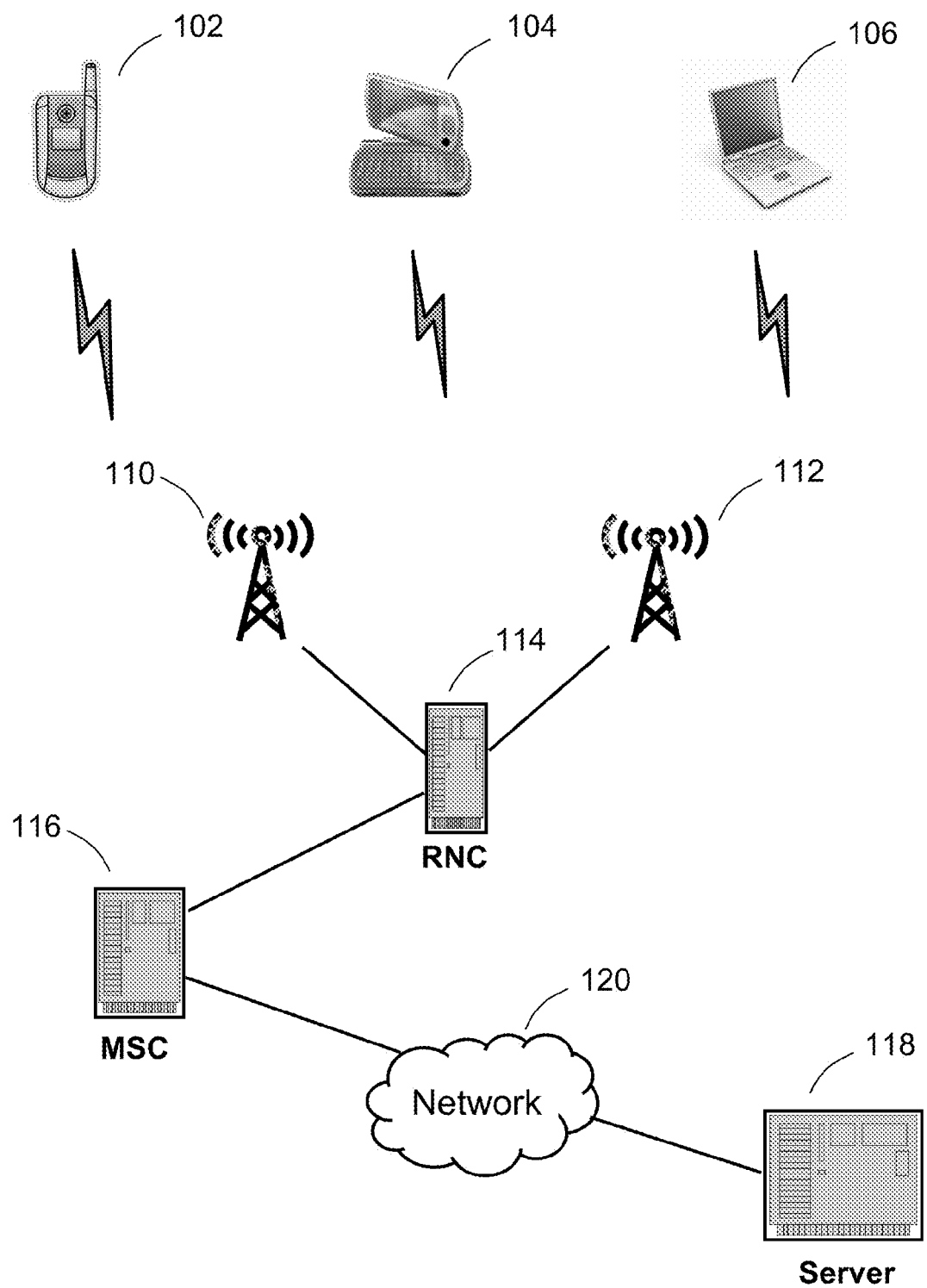
FIG. 1 illustrates an exemplary wireless telecommunications network.

FIG. 1 illustrates an exemplary wireless telecommunications network capable of implementing an embodiment of the present invention. As illustrated in FIG. 1, the wireless telecommunications network includes base stations 110 and 112, a Radio Network Controller (RNC) 114, and a Mobile Switching Center (MSC) 116. Wireless communication devices 102, 104, and 106 communicate with the base stations 110 and 112 using a wireless protocol, such as TDMA, CDMA, GSM, etc. The present invention is not limited to any particular wireless technology. The base stations 110 and 112 are connected to the MSC 116 through the RNC 114. The RNC 114 controls handoffs between the base stations 110 and 112 as the wireless communication devices 102, 104, and 106 move from the range of one of the base stations 110 and 112 to the other one of the base stations 110 and 112. Under normal operating conditions (no emergency or power outage), the base stations 110 and 112 receive calls from the wireless communication devices 102, 104, and 106.

These calls comprise digits input via the wireless communications devices 102, 104 and 106. For example, the digits can include a destination phone number. The digits can also include a code, such as a priority code, in addition to a destination phone number. The base stations 110 and 112 relay the calls through the RNC 114 to the MSC 116. The MSC 116 processes the calls based on the input digits in order to route the calls to the destinations, and thus establish connections between the wireless communication devices 102, 104 and 106 and their respective destinations. The MSC 116 can be connected to an applications server 118 via a communication network 120, such as an IP network, a PSTN network, etc. The applications server 118 can store data and/or applications used by the MSC 116 to process and route the calls.

According to an embodiment of the present invention, in emergency or power outage situations, the telecommunications network selectively establishes connections based on at least one list of permissible numbers. Accordingly at least one of the base stations 110 and 112, the RNC 114, the MSC 116, and the applications server 118 maintain a permissible number list that includes entries which correspond to permissible numbers. For example, these entries can include emergency phone numbers, such as 911, Government Emergency Telecommunications Service (GETS) codes, Wireless Priority Service (WPS) codes, and/or any other specified destination phone numbers. It is possible that the list of permissible numbers be distributed over multiple devices in the telecommunications network. Only calls in which the input digits match the numbers included in the list of permissible numbers are connected by the telecommunications network. The entries in the permissible number list may be specified using wild card characters, such that any phone number dialed after a certain code (e.g., a code corresponding to GETS or WPS) is considered permissible.

Figure 2:
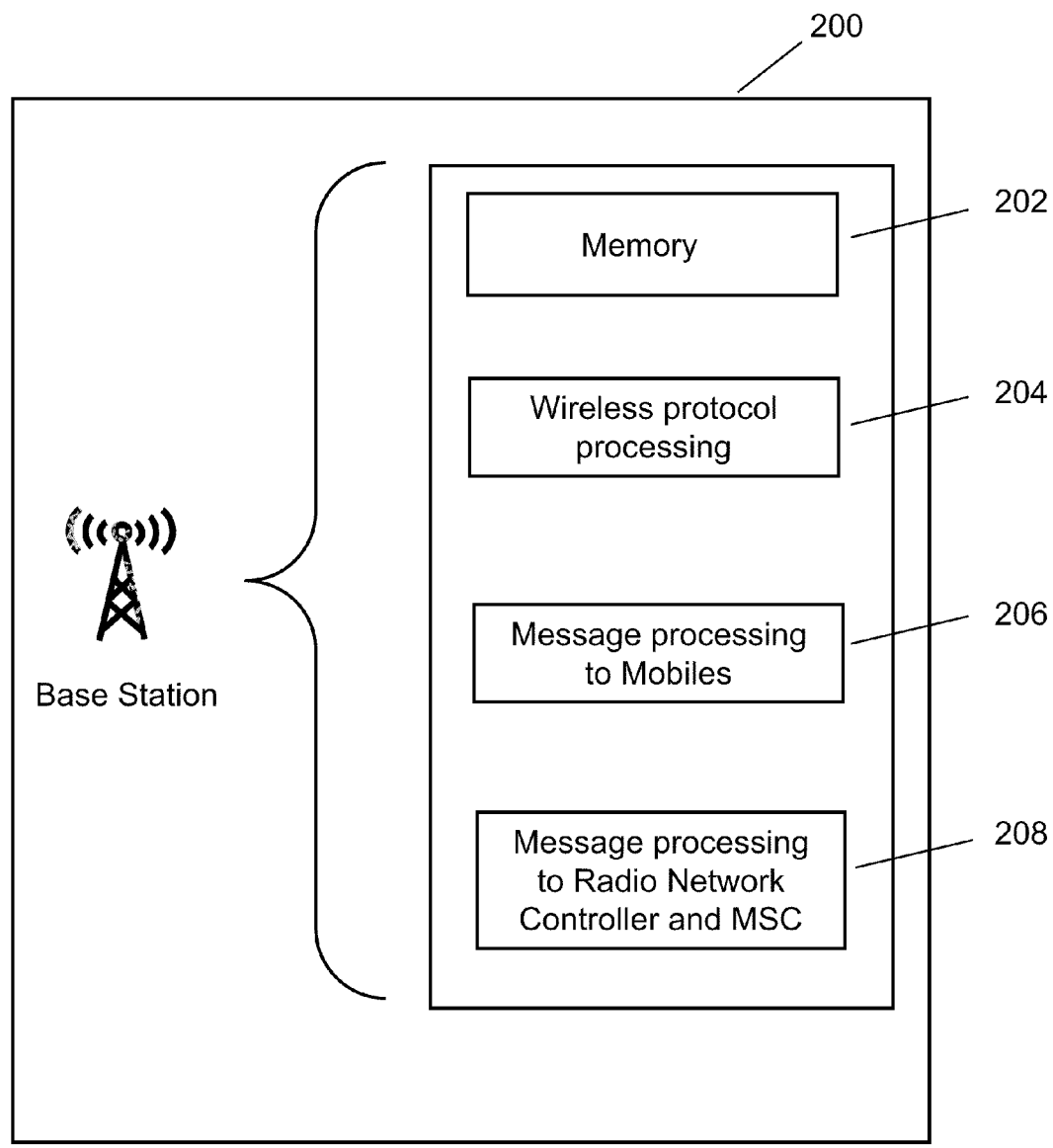
FIG. 2 illustrates an exemplary base station.

FIG. 2 illustrates an exemplary base station 200 capable of implementing an embodiment of the present invention. As illustrated in FIG. 2, the base station 200 includes memory 202 and various modules for performing various tasks. According to an embodiment of the present invention, the memory 202 can be used to store a list of permissible numbers. A wireless protocol processing module 204 controls communications with communications devices via a wireless protocol and receives calls from communication devices. Message processing modules 206 and 208 control transmission of calls (messages) to the communication devices and to the RNC and MSC, respectively. When a communication device of a user communicating with the base station is the destination for a call transmitted to the base station from the MSC, the message processing to mobiles module 206 alerts the destination communication device of the call and establishes a connection with the destination communication device. When a call is received at the base station from a communication device communicating with the base station, the message processing to RNC and MSC module 208 transmits the call to the MSC through the RNC. According to an embodiment of the present invention in which the base station implements the present invention, when a call is received at the base station from a wireless communication device via the wireless protocol processing module 204, the base station 200 compares the digits of the destination phone number of the call with the list of permissible numbers stored in the memory 202. In this embodiment, the message processing to RNC and MSC module 208 transmits the call to the MSC through the RNC only if the destination phone number of the call is included in the list of permissible numbers.

Figure 3:
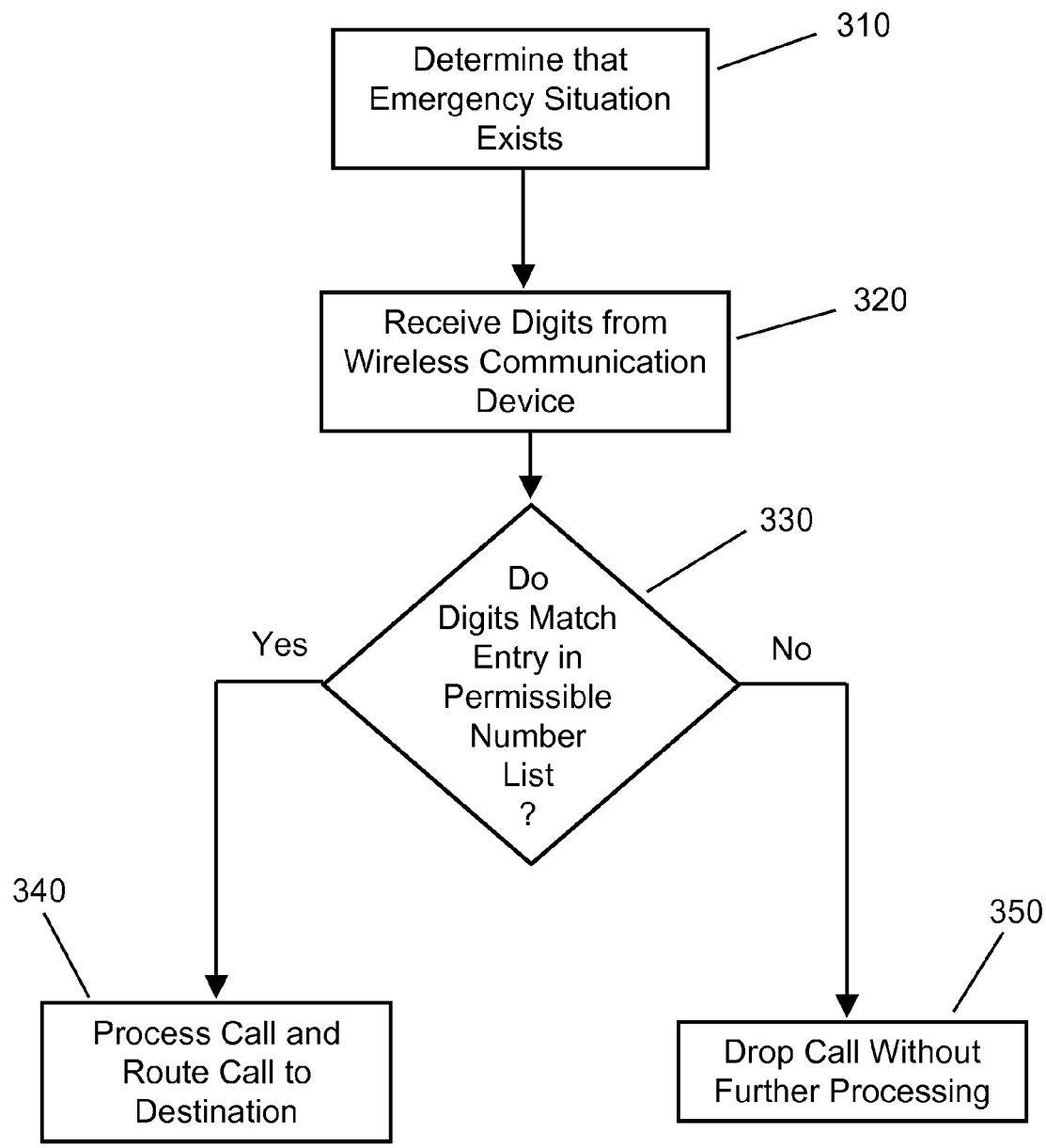
FIG. 3 illustrates a method of conserving power in a telecommunications network according to an embodiment of the present invention.

FIG. 3 illustrates a method of conserving power in a telecommunications network according to an embodiment of the present invention. This method may be implemented in any device, such as a base station, an RNC, or an MSC, of a telecommunications network. This method may also be implemented using multiple telecommunications network devices. As described above, a permissible number list is maintained on at least one of the telecommunications network devices. The permissible number list can include entries corresponding to emergency phone numbers and priority calling codes.

At step 310, it is determined that an emergency situation exists. An emergency situation refers to any situation in which power to the telecommunications network is limited or it is desirable to limit calls to emergency and/or priority calls. For example, emergency situations can include natural disasters, terrorist attacks, power outages, etc. It is possible that the device or devices in the telecommunication network which implement the method of conserving power determine that an emergency situation exists when a signal alerting of the emergency situation is received. For example, a telecommunications network manager can send a signal to a base station from a remote location alerting the base station to an emergency situation. It is also possible that a device in the telecommunications network can automatically sense when a power outage occurs in order to determine when an emergency situation exists and transmit the signal to other device in the network when a power outage occurs.

At step 320, input digits are received from a wireless communication device. For example, the digits may be received from a communication device, such as a cellular telephone or a PDA, at a base station. The digits can include a destination phone number, and can also include a code, such as a priority code in addition to the destination phone number.

At step 330, the received digits are compared to the permissible number list to determine whether the digits match an entry in the permissible number list. If the received digits match an entry in the permissible number list, the method proceeds to step 340. If the received digits do not match an entry in the permissible number list, the method proceeds to step 350. According to an embodiment of the present invention, the permissible number list can include emergency numbers, such as 911. The permissible number list may also include one or more pre-designated priority codes (ie., GETS, WPS), followed by a wild card, such that any destination number preceded by the priority code is permissible. The permissible number list may include various other numbers, and is not limited to these examples. Also, the permissible number list may be maintained on the same device or on a separate device from the device which performs the step of comparing the received digits with the permissible number list. For example, it is possible that the permissible number list can be stored on the RNC, MSC, or applications server, and when the base station receives a call, the base station retrieves the permissible number list and compares the received digits with the permissible number list.

At step 340, when it is determined that the received digits match an entry in the permissible number list, the call is processed and routed to the destination phone number. For example, if it is determined in a base station that digits of a received call are included in the permissible number list, the call is then relayed to the MSC through the RNC, and the MSC processes the call and routes the call to the destination phone number. Thus, a connection can be established between the communication device from which the call originated and a destination identified by the destination phone number.

At step 350, when it is determined that the received digits do not match an entry in the permissible number list, the call is dropped without any further processing. For example, if it is determined in a base station that a call is impermissible (not on the permissible number list), the call is immediately dropped, and is not relayed to the MSC for processing. Accordingly, power is conserved by only establishing connections via the telecommunications network for calls to numbers on the permissible number list. Furthermore, telecommunications network congestion can be relieved so that important calls (to numbers on the permissible number list) can get through.

Although destination phone numbers of incoming calls are compared to one permissible number list in the embodiment of FIG. 3, the present invention is not limited thereto. According to another embodiment of the present invention, it is possible to maintain multiple permissible number lists in the telecommunications network. For example, there may be multiple lists corresponding to different levels or types of emergencies. Thus, it is possible to vary the amount of power conservation by restricting calls using different lists based on the seriousness of the situation.

Figure 4:
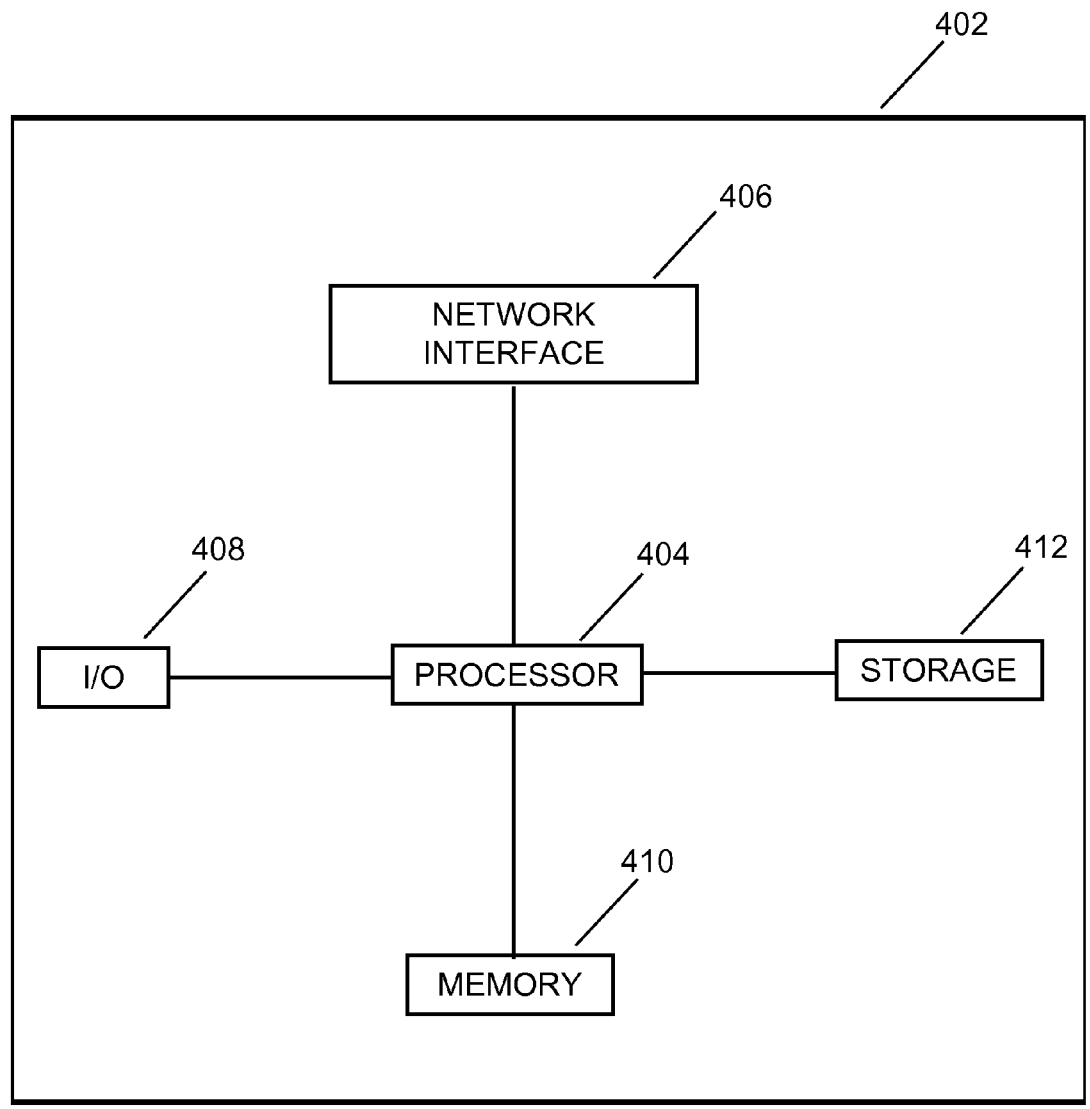
FIG. 4 is a high level block diagram of a computer capable of implementing an embodiment of the present invention.

According to various embodiments of the present invention, the above described method may be performed by one or more various telecommunications device including a base station, an RNC, an MSC, and an application server. These devices may be implemented on appropriately configured computers, for example, using well known computer processors, memory units, storage devices, computer software, and other components. A high level block diagram of such a computer is shown in FIG. 4. Computer 402 contains a processor 404 which controls the overall operation of computer 402 by executing computer program instructions which define such operation. The computer program instructions may be stored in a storage device 412 (e.g., magnetic disk) and loaded into memory 410 when execution of the computer program instructions is desired. Thus, the operation of the computer will be defined by computer program instructions stored in memory 410 and/or storage 412 and the operation of the computer will be controlled by processor 404 executing the computer program instructions. Computer 402 also includes one or more network interfaces 406 for communicating with other devices via a network. Computer 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method in at least one device of conserving power in a telecommunications network, comprising:
   determining that an emergency situation exists;
   receiving a call that identifies digits input from a communication device during said emergency situation; and
   in response to said determining that an emergency situation exists:
      identifying which type of a plurality of types of emergencies characterizes said emergency situation, each of said plurality of types of emergencies corresponds to one of a plurality of permissible number lists;
      selecting a permissible number list from said plurality of permissible number lists that is tied to said identified type of the emergency situation, wherein a first type of emergency that is more severe than a second type of emergency is tied to a first permissible number list that is more power conserving than a second permissible number list;
      comparing the digits to each of a plurality of entries in said permissible number list,
      if the digits match an entry in said plurality of entries in said permissible number list, then routing the call, and
      if the digits do not match any one of said plurality of entries in said permissible number list, then dropping the call.

2. The method of claim 1, further comprising maintaining said permissible number list on the at least one device in said telecommunications network.

3. The method of claim 1, wherein said step of determining that an emergency situation exists comprises detecting a power outage in said telecommunications network.

4. The method of claim 1, wherein at least one entry in the permissible number list is a telephone number for emergency services.

5. The method of claim 1, wherein at least one entry in the permissible number list includes a code corresponding to at least one priority service.

6. The method of claim 5, wherein said at least one priority service is at least one of Government Emergency Telecommunications Service (GETS) and Wireless Priority Service (WPS).

7. The method of claim 1, further comprising sending a signal to a base station from a remote location to alert the base station to the emergency situation.

8. The method of claim 1, further comprising automatically sensing when a power outage occurs, determining when the emergency situation exists, and transmitting a signal to at least one other device in the telecommunications network when the power outage occurs.

9. An apparatus in a telecommunications network, comprising:
   means for determining that an emergency situation exists;
   means for receiving a call that identifies digits input from a communication device during said emergency situation;
   means for identifying which type of a plurality of types of emergencies characterizes said emergency situation, each of said plurality of types of emergencies corresponds to one of a plurality of permissible number lists;
   means for selecting a permissible number list from said plurality of permissible number lists that is tied to said identified type of the emergency situation, wherein a first type of emergency that is more severe than a second type of emergency is tied to a first permissible number list that is more power conserving than a second permissible number list;
   means for comparing the digits to each of a plurality of entries in said permissible number list;
   means for routing the call when the digits match an entry in said plurality of entries in the permissible number list; and means for dropping the call when the digits do not match any of said plurality of entries in the permissible number list.

10. The apparatus of claim 9, further comprising means for storing the permissible number list.

11. The apparatus of claim 9, wherein said means for determining that an emergency situation exists comprises means for detecting a power outage in said telecommunications network.

12. The apparatus of claim 9, wherein at least one entry in the permissible number list is a telephone number for emergency services.

13. The apparatus of claim 9, wherein at least one entry in the permissible number list includes a code corresponding to at least one priority service.

14. The apparatus of claim 13, wherein said at least one priority service is at least one of Government Emergency Telecommunications Service (GETS) and Wireless Priority Service (WPS).

15. The apparatus of claim 9, further comprising a telecommunications network manager capable of sending a signal to a base station from a remote location, alerting the base station to the emergency situation.

16. The apparatus of claim 9, further comprising a device in the telecommunications network capable of automatically sensing when a power outage occurs, determining when the emergency situation exists, and transmitting a signal to at least one other device in the telecommunications network when the power outage occurs.

17. A computer readable medium storing computer program instructions for performing a power conservation method in a telecommunications network, said computer program instructions defining the steps comprising:

sensing automatically an interruption in power in the telecommunications network to determine that an emergency situation exists;

receiving a call that identifies digits input from a communication device during said emergency situation; and in response to said determining that an emergency situation exists:

identifying which type of a plurality of types of emergencies characterizes said emergency situation each of said plurality of types of emergencies corresponds to one of a plurality of permissible number lists;

selecting a permissible number list from said plurality of permissible number lists that is tied to said identified type of the emergency situation, wherein a first type of emergency that is more severe than a second type of emergency is tied to a first permissible number list that is more power conserving than a second permissible number list;

comparing the digits to each of a plurality of entries in said permissible number list, if the digits match an entry in said plurality of entries in said permissible number list, then routing the call, and if the digits do not match any of said plurality of entries in said permissible number list, then dropping the call.

18. The computer readable medium of claim 17, further comprising computer program instructions defining the step of maintaining said permissible number list on at least one device in said telecommunications network.

19. The computer readable medium of claim 17, wherein said computer program instructions defining the step of determining that an emergency situation exists comprise computer program instructions defining the step of detecting a power outage in said telecommunications network, wherein the computer program instructions defining said comparing step are executed in response to detecting the power outage in said telecommunications network.

20. The computer readable medium of claim 17, wherein at least one entry in the permissible number list is a telephone number for emergency services.

21. The computer readable medium of claim 20, wherein at least one entry in the permissible number list includes a code corresponding to at least one priority service.

22. The computer readable medium of claim 21, wherein said at least one priority service is at least one of Government Emergency Telecommunications Service (GETS) and Wireless Priority Service (WPS).

* * * * *